United States Patent
Brown

(10) Patent No.: US 12,341,329 B2
(45) Date of Patent: Jun. 24, 2025

(54) WIRE MANAGEMENT DEVICE

(71) Applicant: Bruce Brown, Philadelphia, PA (US)

(72) Inventor: Bruce Brown, Philadelphia, PA (US)

(*) Notice: Subject to any disclaimer, the term of this patent is extended or adjusted under 35 U.S.C. 154(b) by 185 days.

(21) Appl. No.: 18/301,552

(22) Filed: Apr. 17, 2023

(65) Prior Publication Data

US 2024/0348032 A1    Oct. 17, 2024

(51) Int. Cl.
*H02G 3/30*    (2006.01)

(52) U.S. Cl.
CPC .................... *H02G 3/30* (2013.01)

(58) Field of Classification Search
CPC .... H02G 3/30; H02G 9/10; F16L 3/02; H01R 4/646
USPC ........................................ 174/72 A
See application file for complete search history.

(56) References Cited

U.S. PATENT DOCUMENTS

| | | | |
|---|---|---|---|
| 10,541,523 B2 * | 1/2020 | Wang | F03D 80/85 |
| 10,574,048 B2 | 2/2020 | Nowastowski-Stock | |
| 10,700,502 B2 | 6/2020 | Mechler et al. | |
| 2006/0278427 A1 * | 12/2006 | Mahoney | H02G 3/30 174/135 |
| 2007/0246613 A1 | 10/2007 | Kennedy | |
| 2021/0407703 A1 * | 12/2021 | Rouleau | H02G 3/32 |

* cited by examiner

*Primary Examiner* — Timothy J Thompson
*Assistant Examiner* — Michael F McAllister
(74) *Attorney, Agent, or Firm* — Harpman & Harpman

(57) ABSTRACT

A wire management device for protecting and organizing flexible equipment service supply lines for equipment deployment consumables such as welding gas and air. A plurality of individual line guide and support sleeves are secured together in spaced parallel relation in a flexible fitting with differential adjustable clamps that allow temporary securement to fixed structures around and through which the equipment service lines must pass.

8 Claims, 4 Drawing Sheets

WIRE MANAGEMENT DEVICE

BACKGROUND OF THE INVENTION

1. Technical Field

This device relates to wire and line guides that provide safe positioning of service lines and the like to prevent damage to the lines during use.

2. Description of Prior Art

Prior art devices have been developed for guiding wires and cables through walls and equipment openings, see for example U.S. Pat. Nos. 10,574,048, 10,700,502 and U.S. Publication 2007/0246613.

U.S. Pat. No. 10,574,048 is directed to a cable wall pass through and duct defining a housing mounted in a wall opening having multiple spacers formed in corresponding recesses with sealing elements through which the cables pass.

U.S. Pat. No. 10,700,502 claims a wall penetration panel having multiple frame plates and gaskets with cable component apertures with frictional reduction fittings.

U.S. Publication 2007/0246613 discloses a wire management and strain relief device that has a strap with wire receiving access apertures. The strap can be positioned about a fixture and secured together by its free end thus supporting and separating a number of wires passed therethrough.

SUMMARY OF THE INVENTION

An adjustable equipment service line receiving guide device that can be selectively and temporarily attached to fixed elements around or through which equipment lines must pass. The line receiving and guide device has multiple parallel spaced receiving conduits secured together in a flexible strip with directionality adjustable extending fixation clamps. Orientation and placement allow for the safe and secure placement of line guide sleeves to prevent damage of the lines passing there through for remote equipment use.

DETAILED DESCRIPTION OF THE INVENTION

Figure 1:
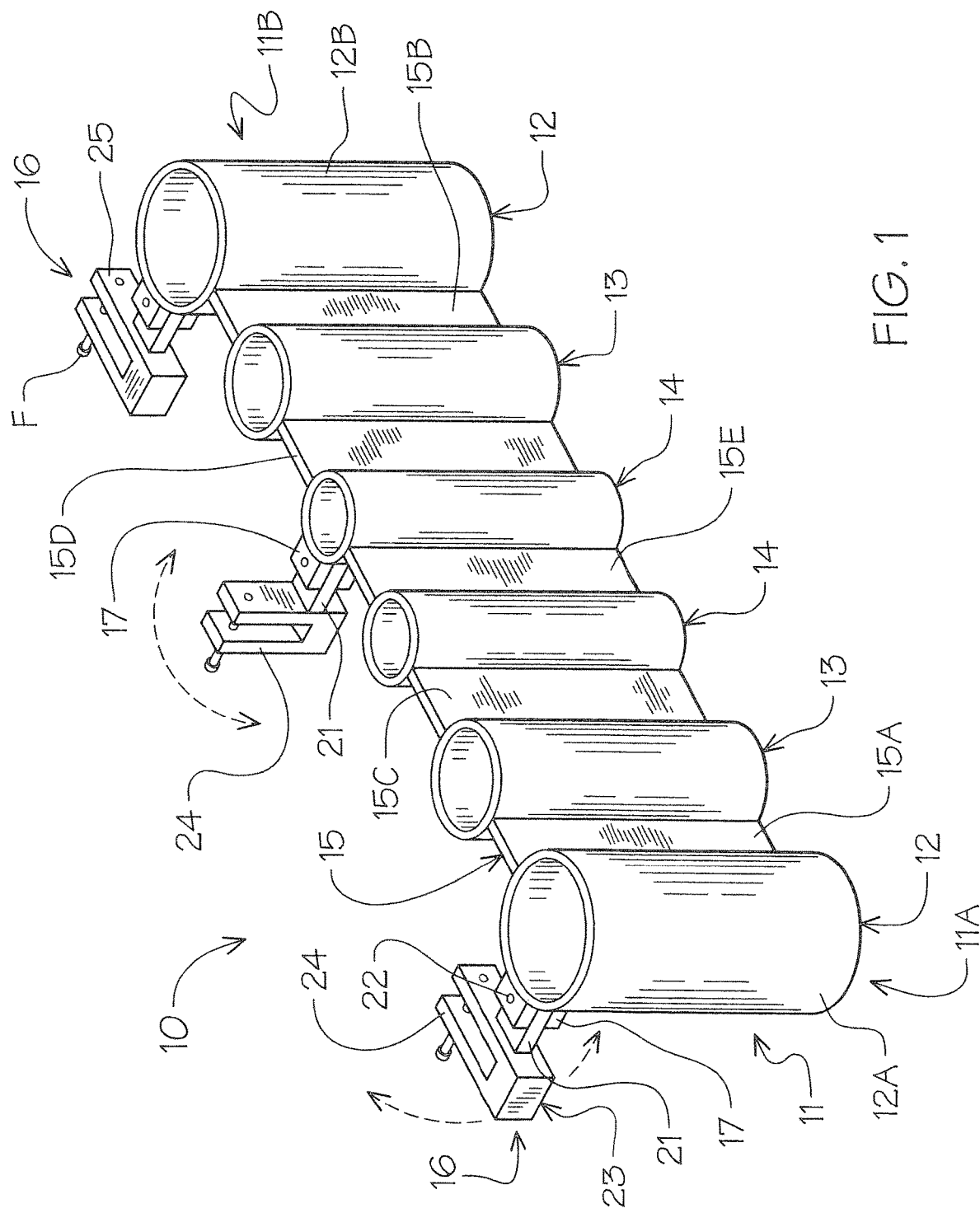
FIG. 1 is a front, top, side perspective view of the line guide device of the invention.
Figure 2:
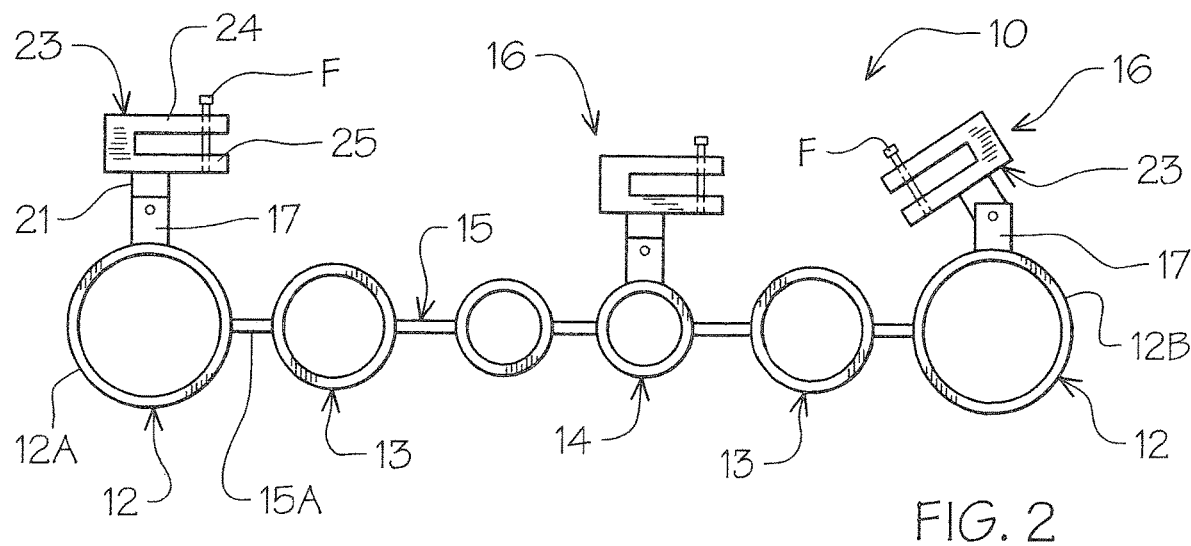
FIG. 2 is a top plan view of the line guide device of the invention.
Figure 3:
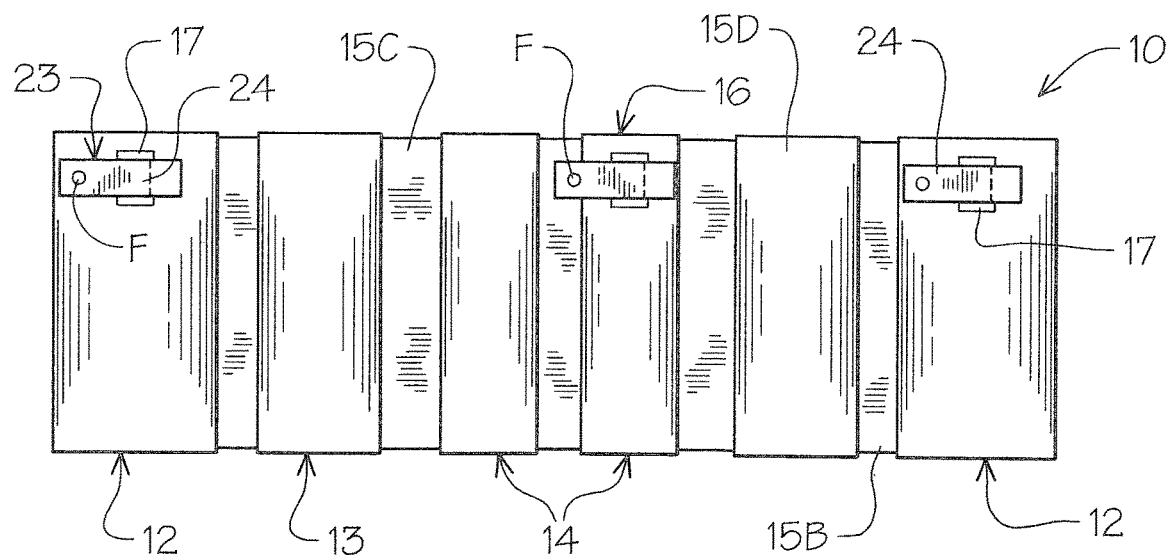
FIG. 3 is a rear elevational view thereof.

Referring to FIGS. 1-3 of the drawings, a service line guide 10 of the invention can be seen having an elongated body member 11 formed by a series of interconnected cylindrical guide sleeves of equal length secured in spaced parallel relation to one another. In this example, three pairs of guide sleeves 12, 13 and 14 of different interior and exterior diameters are joined together by interconnecting integral continuous flanges 15 there between. The guide sleeve pair 12 defined as 12A and 12B are formed on oppositely disposed ends 11A and 11B with the sleeve pair 13 being of a reduced exterior and interior diameter secured respectively thereto by flanges 15A and 15B. The guide sleeve pair 14 is in turn secured from the respective guide sleeve pair 13 by interconnecting continuous flanges 15C and 15D with an interconnecting flange 15E there between of reduced transverse dimension. The guide sleeve pair 14 is of a reduced exterior and interior dimension to that of the adjoining guide sleeve pair 13 to accommodate different size service lines which may be used, not shown.

Figure 7:
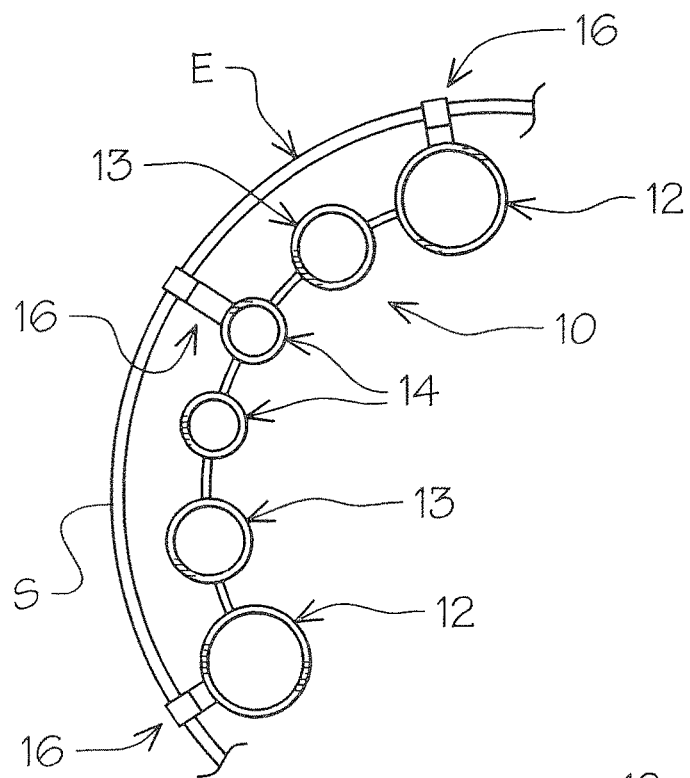
FIG. 7 is a graphic top plan view of the line receiving and guide device clamped on a portion of a fixed curved opening element.

It will be evident from the above description that the respective guide sleeve pairs 12, 13 and 14 are, in this example, of a descending diameter with the centrally positioned guide sleeve pair 14 being the smallest and with increased spacing from the adjacent guide sleeve pair 13. As will be seen, their orientation will allow for greater longitudinal flexibility of the guide to conform to different mounting applications as illustrated in FIG. 7 of the drawings and described in greater detail hereinafter. The guide is made of synthetic resin material having a flexible yielding property.

Figure 8:
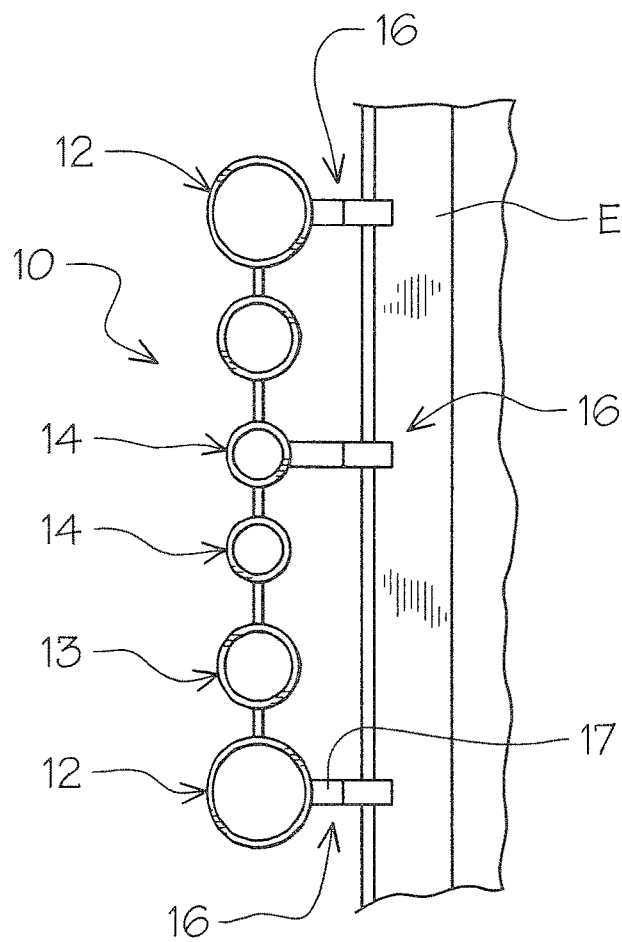
FIG. 8 is a graphic top plan view of the line receiving guide device clamp on a straight portion of a fixed element.

It will also be evident that respective guide sleeve diameters and spacing of the so defined guide sleeve body member may vary depending on use application illustrated graphically in FIGS. 7 and 8 of the drawings.

Figure 4:
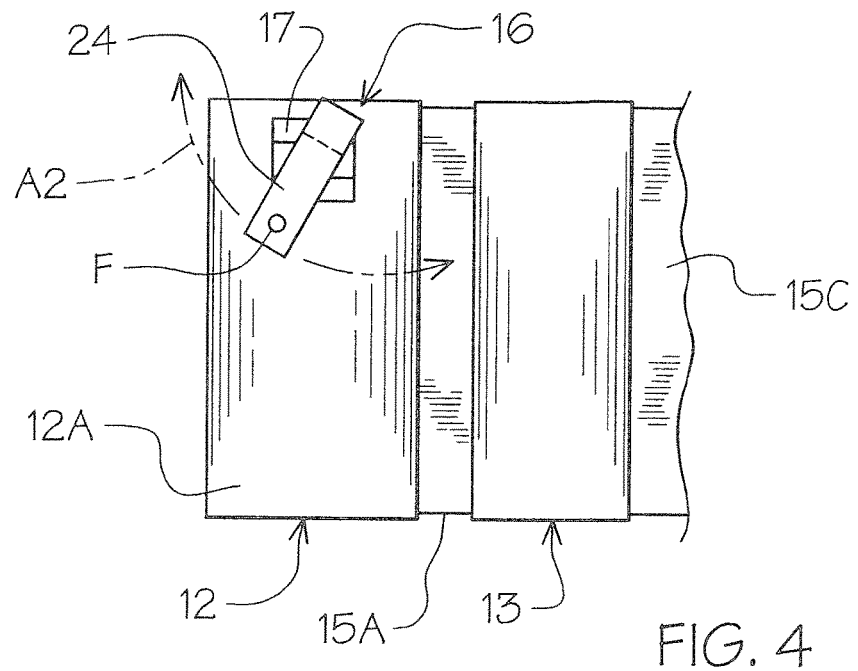
FIG. 4 is an enlarged partial side elevated view with portions broken away illustrating the adjustable clamp orientation.
Figure 5:
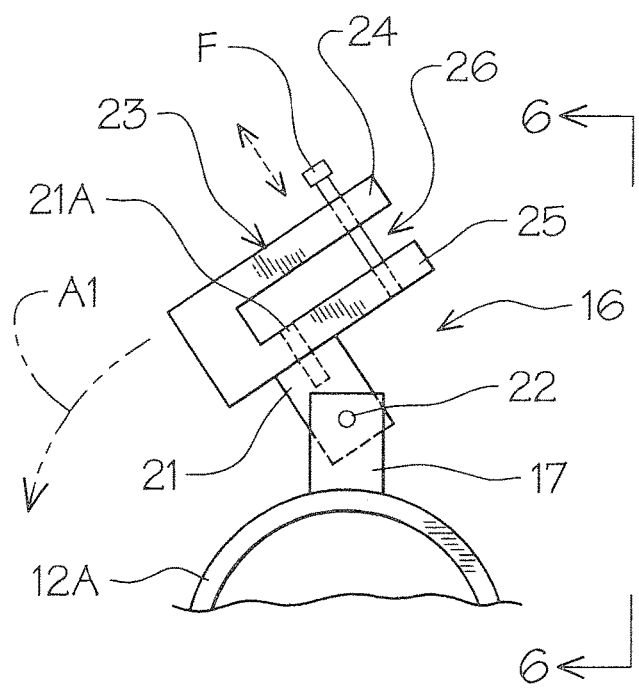
FIG. 5 is an enlarged partial top plan view of the adjustable clamp repositioned for use.
Figure 6:
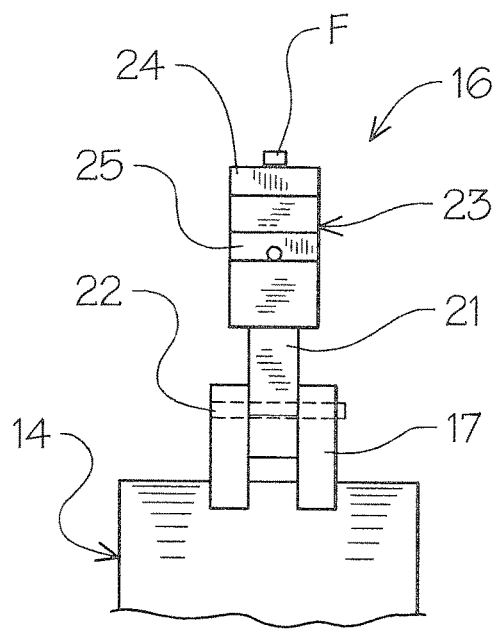
FIG. 6 is an enlarged partial view of lines 6-6 of FIG. 5.

Referring back to FIGS. 1-3 and now FIGS. 4-6 of the drawings, an adjustable clamp assembly 16 can be seen extending from individual select guide sleeve pairs 12 and 14. The clamp assembly 16 is pivotally secured between apertured upstanding mounting lug pairs 17 which are molded with the respective sleeves and extend therefrom the sleeves corresponding sidewalls. The clamp assembly 16 has an upstanding apertured base portion 21 pivotally secured between respective lug pairs by pivot pin 22. A "C" shaped clamp portion 23 of the adjustable clamp assembly 16 is pivotally attached at the respective base portion 21 at 21A having a pair of spaced parallel arms 24 and 25 defining a receiving channel 26 for retaining engagement on a fixed element of a support structure as seen graphically in FIGS. 7 and 8 of the drawings.

The clamp arms 24 and 25 have aligned threaded apertures there through for registration fastener F that will thereby clamp the arm against a fixed element E. It will be seen that the service line receiving guide 10 of the invention can be used on a variety of applications by selectively attaching the guide 10 to related structures using the fully adjustable clamp assembly 16 which allows for multiple access orientation to temporarily hold the guide in place even when configured by bending as seen in FIG. 7 of the drawings on a contoured surface S.

The clamp assembly 16 will allow for different clamp engagement orientation by its ability to pivotally adjust on multiple axis illustrated graphically in FIGS. 4, 5 and 6 of the drawings. A first pivot axis indicated by broken arrow A1 and a second pivot axis indicated by broken line at arrow A2. This multiple axis clamp engagement adjustment will in combination offer a wide variety of attachment, retainment and yieldable flexibility of the clamp 10 as may be needed in different use application venues.

It will thus be seen that a new and novel wire guide and clamp configuration has been illustrated and described and it will be apparent to those skilled in the art that various changes and modifications may be made therein without departing from the spirit of the invention.

Therefore, I claim:

1. A service line management device for remote equipment comprising,
   a device body having a plurality of discrete guide sleeves interconnected to one another made of synthetic resin material,
   said guide sleeves are of equal longitudinal length in spaced parallel relation to one another,
   a plurality of clamps adjustably positioned extending from select guide sleeves for temporarily securing the service line management device for fixed structures.

2. The service line management device set forth in claim 1 wherein said guide sleeves are of different interior and exterior diameters.

3. The service line management device set forth in claim 1 wherein said guide sleeves are interconnected by integral elongated flanges.

4. The service line management device set forth in claim 1 wherein said clamps comprise, a base pivotally secured to said respective guide sleeves, a bifurcated clamp engagement portion pivotally secured to said base for multiple access positioning of said guide sleeve.

5. The service line management device set forth in claim 1 wherein said device body is movable from a first position to a second concave/convex curvilinear position by said clamp engagement on a contoured edge surface.

6. The service line management device set forth in claim 2 wherein said discreet guide sleeves are of different interior and exterior diameters, said guide sleeves positioned in pairs of identical diameter in spaced relation to said adjacent guide sleeve pairs.

7. The service line management device set forth in claim 3 wherein said elongated flanges are of varied transverse dimension to one another.

8. The service line management device set forth in claim 4 wherein said bifurcated clamp engagement portion has threaded fasteners threadably received there through.

* * * * *